UNITED STATES PATENT OFFICE.

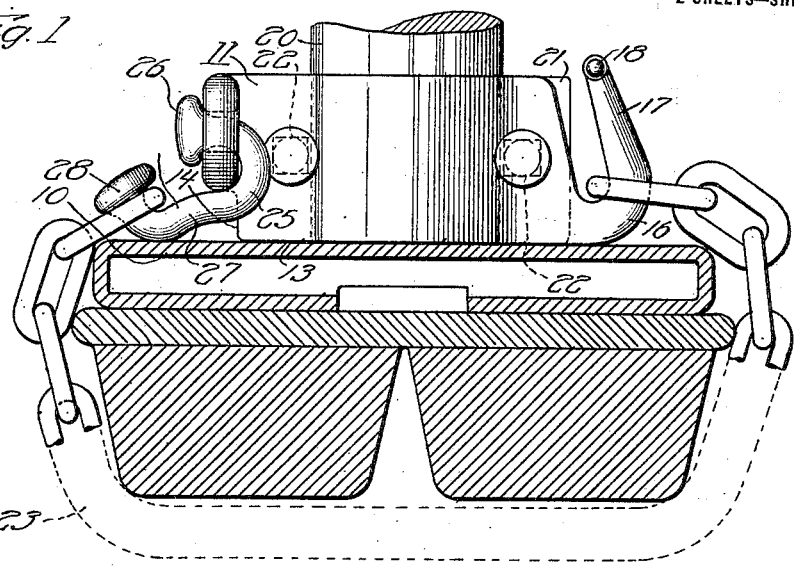
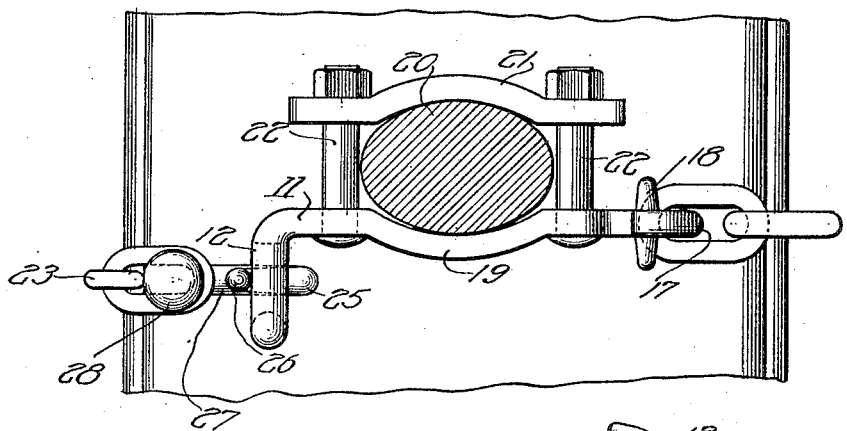
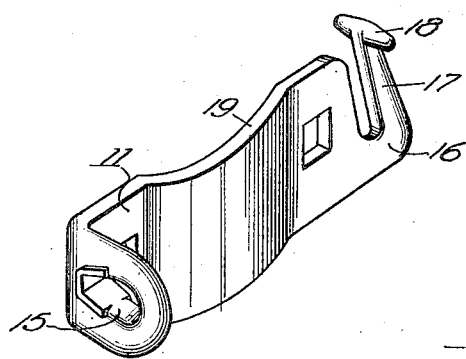

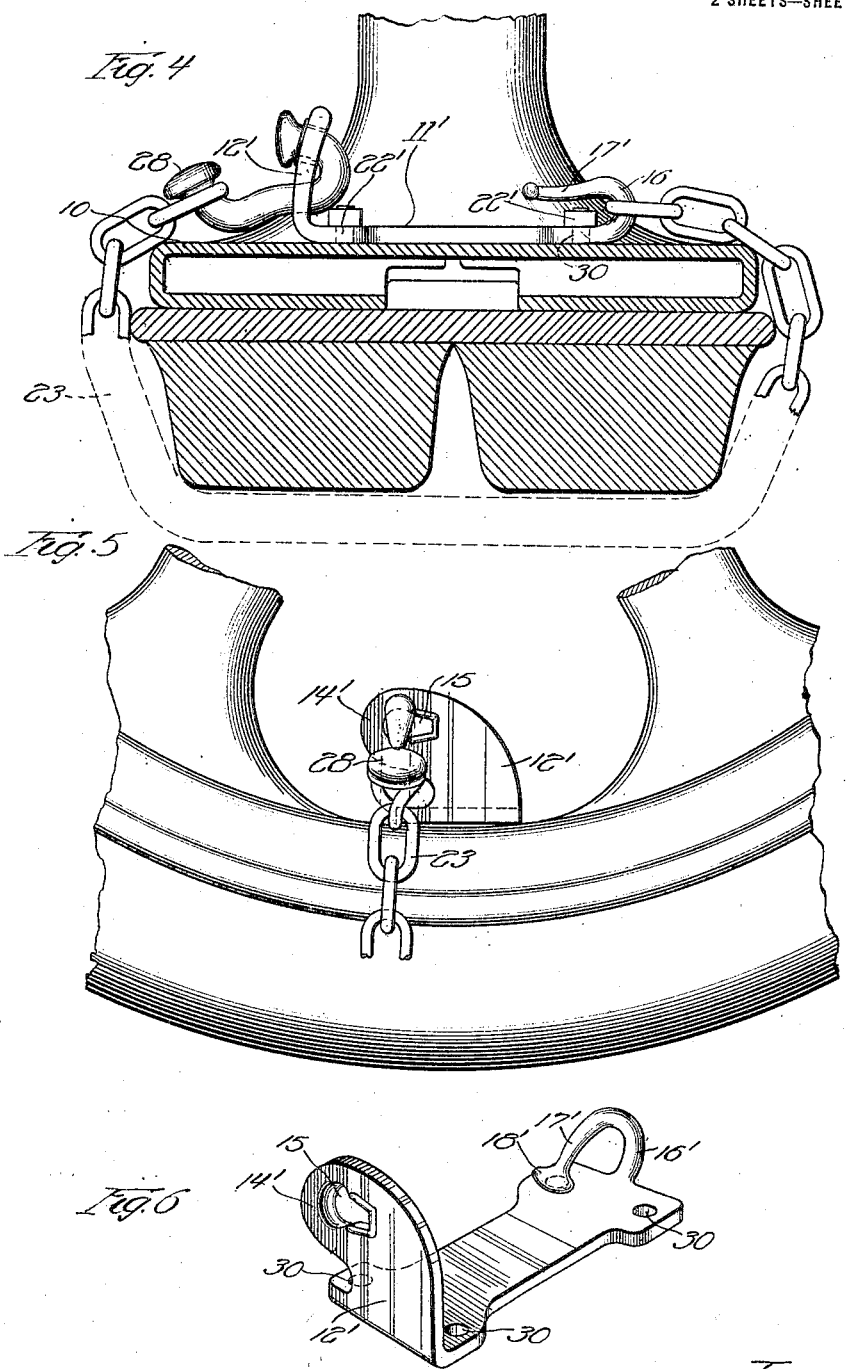

WILLIAM H. KRUG, OF FOND DU LAC, WISCONSIN.

ANTISKID DEVICE.

1,385,010.

Specification of Letters Patent.  Patented July 19, 1921.

Application filed August 6, 1919.  Serial No. 315,597.

*To all whom it may concern:*

Be it known that I, WILLIAM H. KRUG, a citizen of the United States, residing at Fond du Lac, in the county of Winnebago and State of Wisconsin, have invented a certain new and useful Improvement in Antiskid Devices, of which the following is a full, clear, concise, and exact description, reference being had to the accompanying drawings forming a part of this specification.

My invention relates to improvements in anti-skid devices, and is especially concerned with the provision of novel and improved means for securing anti-skid chains or the like to vehicle wheels.

Other objects of my invention are:

First: To provide means for securing anti-skid chains or the like to vehicle wheels, embodying means for locking the anti-skid chains to the wheels so that there is no possibility of the chains being accidentally detached from the wheels.

Second: To provide means of this character which will permit the anti-skid chains to be easily and quickly attached to or detached from the vehicle wheels, and Third: To provide means of the character described which is simple in construction and economical to manufacture.

Other objects will appear as this description progresses, reference being had to the accompanying drawing, in which:

Figure 1 is a fragmentary sectional view of a portion of a vehicle wheel showing my improved means for securing anti-skid chains thereto in side elevation.

Fig. 2 is a fragmentary view showing one edge of my improved means.

Fig. 3 is a perspective view of my improved means.

Fig. 4 is a view similar to Fig. 1, showing a modified form of my invention, especially adapted to securing anti-skid chains to wheels having metal fellies.

Fig. 5 is a side view of the construction shown in Fig. 4, and

Fig. 6 is a perspective view of the means illustrated in Figs. 4 and 5 for securing the anti-skid chain to the wheel.

Throughout the several views similar reference characters will be used to refer to similar parts.

Referring to Figs. 1 to 3 inclusive, the reference character 10 indicates the felly of a wheel, which is illustrated as being of the hollow metal type, but which, so far as my invention is concerned, may be of any desired construction.

The reference character 11 indicates a bar, preferably of forged steel. One end (12) of this bar is bent at substantially right angles to the plane of the bar, and also offset from the edge (13) of the bar, which rests against the felly, as indicated at 14. The offset end is provided with a key hole slot (15), the function of which will be referred to later on in this description.

The opposite end of the bar (11) is provided with a hook comprising a bight portion (16) and a bill portion (17), having a cross head (18) at its free end. All portions of the hook, with the exception of the cross head (18) lie substantially in the plane of the bar (11). A portion (19) of the bar (11) intermediate its ends is bent out of the plane of the bar to provide a seat for the spoke (20) of the wheel. A clip (21) and bolts (22) serve to hold the bar (11) to the spoke.

When it is desired to secure one of the anti-skid chains (23) to the wheel of a vehicle provided with the clamping bars described above, one of the links at one end of the chain is first passed over the cross head (18) of the hook by bringing its longer axis parallel with the axis of said cross head, whereupon the link will pass over the cross head and into the bight of the hook. The opposite end of the anti-skid chain is provided with a coupling member (25) similar to that illustrated and described in my Patent No. 1302470, of Apr. 29, 1919, which is provided with an elongated cross head (26) lying in the plane of the shank (27) of the coupling member, and which when brought into proper position relative to the key hole (15) may be manipulated therethrough. After passing through the key hole slot, the coupling member will drop to a position in which it will be locked to the clamping bar. The opposite end of the coupling member is provided with an enlarged head (28) which prevents the link from becoming disengaged from the anti-skid chain. By offsetting the end portion (12) of the bar (11), a clearance space is provided between this offset end and the felly of the wheel, which permits the coupling member (25) to assume a position which will place the least amount of strain upon the bar (11) and the spoke to which it is attached. By placing the bight (16) of the hook and the opposite end of the bar (11) at the edge of the bar resting against the felly, the chain is connected to the bar at the point which will reduce as much as possible the leverage upon the bar of the spoke produced by the pulls created in the anti-skid chain when in operation.

In the modified form of my invention disclosed in Figs. 4, 5 and 6, I have shown a device especially adapted to be secured to a vehicle wheel, having a hollow metal felly (10). This device comprises a bar (11'), having one end (12') bent at substantially right angles thereto. The end (12') is provided with an edgewise off-set portion (14') which is provided with a keyhole slot (15). The opposite end of the bar (11') is provided with a hook comprising a bight (16') and a bill portion (17'), which is reversely curved upon the bar (11'). The free end of the bill portion is provided with a cross head (18'). Bolts (22') extending through holes (30) in the bar, or any other suitable means may be used for securing the bars to the fellies of the wheels. In this construction, the anti-skid chain (23) is secured to the bar (11') in a manner similar to that described in connection with Figs. 1 to 3 inclusive, and any further description thereof is believed to be unnecessary.

While I have described the details of the preferred embodiments of my invention, it is to be clearly understood that my invention is not limited to these details, but is capable of other adaptations and modifications within the scope of the appended claims.

While I have described both embodiments of my invention in connection with a wheel having a hollow metal felly, this is merely for the purpose of illustration, and it is to be clearly understood that my invention is capable of being used with other types of wheels.

Having thus described my invention, what I claim is:

1. Means for securing an anti-skid chain to a vehicle wheel comprising a clamping bar having a hook at one end lying substantially in the plane of said bar, the other end of said bar being offset from one edge of said bar and bent at substantially right angles thereto, the said offset end being provided with means for securing one end of an anti-skid chain, a portion of said bar, intermediate its ends, being bent out of the plane of said bar to provide a spoke seat.

2. Means for securing an anti-skid chain to a vehicle wheel comprising a clamping bar having a hook at one end lying substantially in the plane of said bar, the other end of said bar being offset from one edge of said bar, the said offset end being provided with means for securing one end of an anti-skid chain, a portion of said bar, intermediate its ends, being bent out of the plane of said bar to provide a spoke seat.

3. Means for securing an anti-skid chain to a vehicle wheel comprising a clamping bar having a hook at one end lying substantially in the plane of said bar, the other end of said bar terminating in a portion bent at substantially right angles to the adjacent portion and provided with means for securing one end of an anti-skid chain.

4. Means for securing an anti-skid chain to a vehicle wheel comprising a clamping bar having a hook at one end lying substantially in the plane of said bar, the other end of said bar being offset from one edge of said bar, the said offset end being provided with means for securing one end of an anti-skid chain.

5. Means for securing an anti-skid chain to a vehicle wheel comprising a clamping bar having a hook at one end lying substantially in the plane of said bar, the other end of said bar being offset from one edge of said bar and bent at substantially right angles thereto, the said offset end being provided with means for securing one end of an anti-skid chain.

6. Means for securing an anti-skid chain to a vehicle wheel comprising a clamping bar having a hook at one end, the other end of said bar being offset from one edge of said bar, the said offset end being provided with means for securing one end of an anti-skid chain, a portion of said bar, intermediate its ends, being bent out of the plane of said bar to provide a spoke seat.

7. Means for securing an anti-skid chain to a vehicle wheel comprising a clamping bar, having a hook at one end, the bight of which lies adjacent one edge of said bar, and means for securing an anti-skid chain to the opposite end of said bar, comprising an edgewise offset end portion bent at an angle to said bar, the said end portion being offset from the edge to which the bight of said hook is adjacent.

In witness whereof, I hereunto subscribe my name this 24 day of July, 1919.

WILLIAM H. KRUG.

Witnesses:
M. GOETSCHIUS,
GEO. A. ALTENDORF.